US008090962B2

(12) United States Patent
Challener et al.

(10) Patent No.: US 8,090,962 B2
(45) Date of Patent: Jan. 3, 2012

(54) SYSTEM AND METHOD FOR PROTECTING ASSETS USING WIDE AREA NETWORK CONNECTION

(75) Inventors: David Carroll Challener, Raleigh, NC (US); Justin Tyler Dubs, Durham, NC (US); James Joseph Thrasher, Efland, NC (US); Michael Terrell Vanover, North Hills, NC (US)

(73) Assignee: Lenoro (Singapore) Pte. Ltd., Singapore (SG)

( * ) Notice: Subject to any disclaimer, the term of this patent is extended or adjusted under 35 U.S.C. 154(b) by 919 days.

(21) Appl. No.: 12/051,271

(22) Filed: Mar. 19, 2008

(65) Prior Publication Data

US 2009/0241164 A1 Sep. 24, 2009

(51) Int. Cl.
*G06F 21/00* (2006.01)
(52) U.S. Cl. ............. 713/194; 726/1; 713/184; 713/193
(58) Field of Classification Search ........ 726/1; 713/183, 713/193, 194
See application file for complete search history.

(56) References Cited

U.S. PATENT DOCUMENTS

| 5,892,906 | A | * | 4/1999 | Chou et al. ................. 726/19 |
| 6,166,688 | A | | 12/2000 | Cromer et al. ............ 342/357.17 |
| 6,609,207 | B1 | | 8/2003 | Cromer et al. ................. 713/202 |
| 6,725,379 | B1 | | 4/2004 | Dailey ........................... 713/201 |
| 2003/0014660 | A1 | * | 1/2003 | Verplaetse et al. ............ 713/200 |
| 2003/0120918 | A1 | * | 6/2003 | VanDer Kamp .............. 713/164 |
| 2005/0114663 | A1 | * | 5/2005 | Cornell et al. ................ 713/168 |
| 2005/0246512 | A1 | * | 11/2005 | Inoue ............................ 711/164 |
| 2006/0200679 | A1 | * | 9/2006 | Hawk et al. ................... 713/183 |
| 2006/0242689 | A1 | * | 10/2006 | Nakashima ........................ 726/6 |
| 2006/0245559 | A1 | * | 11/2006 | Hodge et al. ............... 379/88.19 |
| 2007/0005951 | A1 | * | 1/2007 | Davis et al. ...................... 713/2 |
| 2007/0234073 | A1 | * | 10/2007 | Cromer et al. ................ 713/193 |
| 2007/0250910 | A1 | * | 10/2007 | Miller et al. ...................... 726/4 |
| 2008/0052777 | A1 | * | 2/2008 | Kawano et al. ................. 726/18 |

FOREIGN PATENT DOCUMENTS

| EP | 0 899 647 A2 | 3/1999 |
| JP | 2004362366 A * | 12/2004 |
| WO | WO 99/48217 A2 | 9/1999 |

OTHER PUBLICATIONS

IBM Technical Disclosure, "A Merthod of Notebook PC Security Leaving Alone," Mar. 1, 2001, pp. 1-4.*

(Continued)

*Primary Examiner* — Michael Pyzocha
(74) *Attorney, Agent, or Firm* — VanLeeuwen & VanLeeuwen; Carlos Munez-Bustamante

(57) ABSTRACT

A system, method, and program product is provided that detects whether a network adapter has been removed from a computer system. If the network adapter, such as a wireless network adapter, has been removed from the computer system, then a tamper evident indicator (e.g., bit) is set in a nonvolatile memory area of the computer system. In addition, a hard drive password is set to a different password according to a hard drive password policy. The hard drive password controls access to files stored on the hard drive. In one embodiment, the power-on password is also changed to a new password so that the user has to enter the new power-on password when initializing the computer system in order to access the files stored on the computer system.

20 Claims, 6 Drawing Sheets

OTHER PUBLICATIONS

Combined Search and Examination Report from United Kingdom Patent Office for patent application GB0902186.6, mailed May 29, 2009, 7 pages.

"A method of notebook PC security leaving alone," International Business Machines Research Disclosure, RD 443173, vol. 443, Mar. 2001, p. 494.

* cited by examiner

SYSTEM AND METHOD FOR PROTECTING ASSETS USING WIDE AREA NETWORK CONNECTION

BACKGROUND OF THE INVENTION

1. Technical Field

The present invention relates to a system, method, and program product that protects information and computer assets using a wide area network connection of an information handling system.

2. Description of the Related Art

Asset protection is of increased importance with most every type of organization. Not only are the hardware assets, such as laptop computers and accessories, valuable and important to protect, but often the information assets stored on the computer system is even more valuable. Information assets may include proprietary intellectual property of an organization that is extremely valuable. If this valuable information falls into the wrong hands, such as those of a competitor, the organization is likely to suffer irreparable harm.

Always-on protection employing network technology is useful in protecting assets and information assets. Commands can be sent to an information handling system, such as a laptop computer, instructing the computer to lock the system. Moreover, systems with GPS capabilities can use the network to inform a user of the asset's location. In this manner, the asset can be instructed to enter a locked mode to protect the information assets if the system is lost, stolen, or its whereabouts are otherwise unaccounted for. Using GPS technology, the system can also instruct the owner of its whereabouts so that it can be retrieved by the owner or law enforcement. A challenge, however, to always-on asset protection is that the protection can be thwarted if the network adapter used to communicate with the system is removed or otherwise disabled.

SUMMARY

It has been discovered that the aforementioned challenges are resolved by detecting whether a network adapter has been removed from a computer system. If the network adapter, such as a wireless network adapter, has been removed from the computer system, then a tamper evident indicator (e.g., bit) is set in a nonvolatile memory area of the computer system. In addition, a hard drive password is set to a different password according to a hard drive password policy. The hard drive password controls access to files stored on the hard drive. In one embodiment, the hard drive password is set to a supervisory password. In this manner, a malevolent user, such as a thief of the computer system, attempting to thwart the asset protection mechanisms by removing the network adapter would be unable to access the files stored on the hard drive without the new hard drive password (such as the supervisory password). In one embodiment, the power-on password is also changed to a new password (e.g., a supervisory password). In this embodiment, the user would have to enter the new power-on password when initializing the computer system in order to access the files stored on the computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
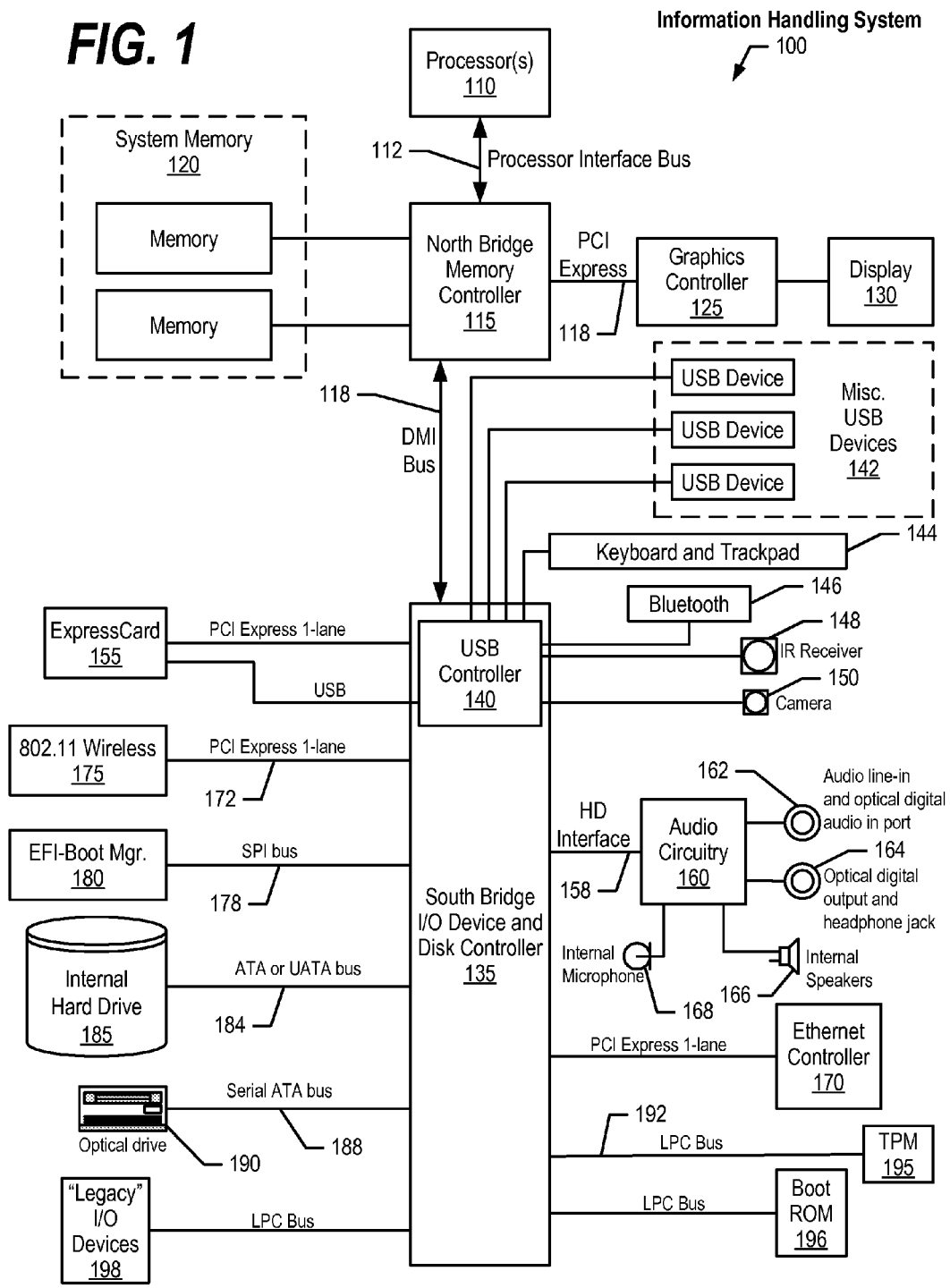
FIG. 1 is a block diagram of a data processing system in which the methods described herein can be implemented.
Figure 2:
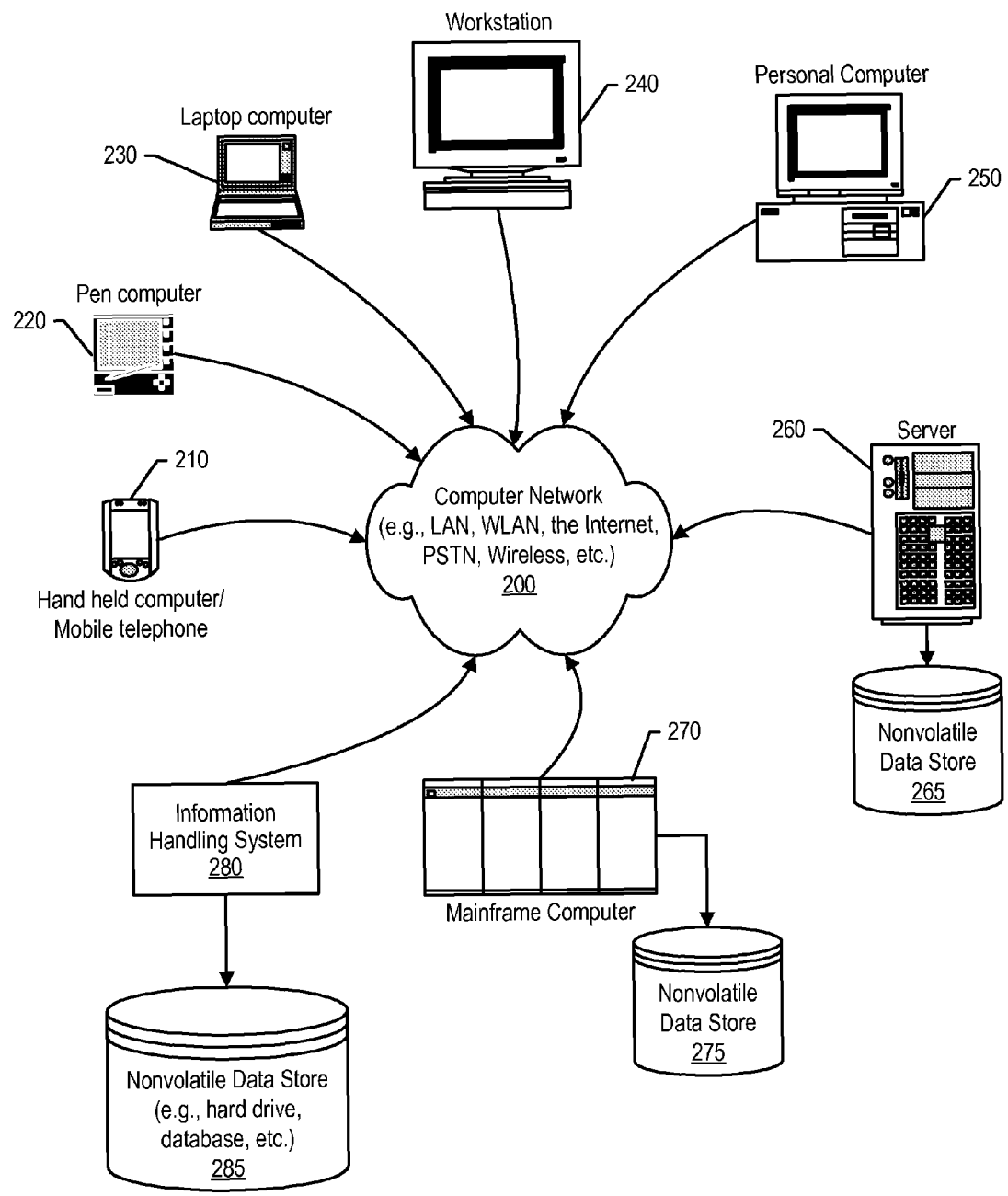
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which are coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
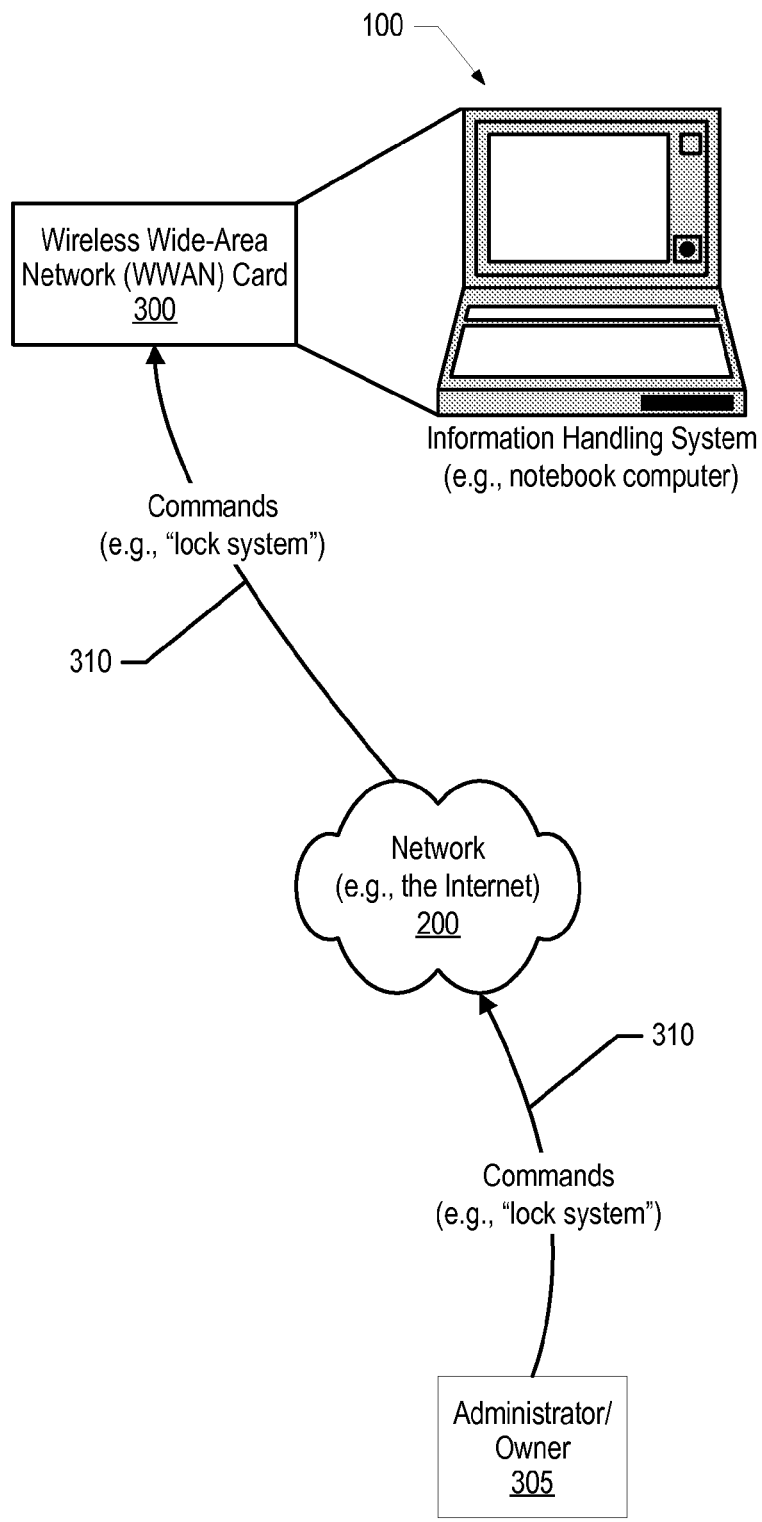
FIG. 3 is a system diagram showing an information handling system with a network adapter receiving remote security commands over a computer network.

FIG. 3 is a system diagram showing an information handling system with a network adapter receiving remote security commands over a computer network. Information handling system 100 includes network adapter 300, such as a wireless wide-area network (WWAN) card, as shown. In a preferred embodiment, this network adapter is "ON" whenever information handling system is powered up, enabling the information handling system to receive commands to, in the case where the system has been lost or stolen, lock the information handling system so that information stored on the information handling system's hard drive cannot be accessed. As used herein, "network adapter" includes any wired or wireless network adapter that allows the information handling system to communicate with another information handling system, such as using computer network 200. Examples of network adapters include Ethernet adapters, Token Ring adapters, wireless 802.11 type adapters, Bluetooth adapters, and any other adapter that allows the information handling system to connect to another information handling system and/or a computer network, such as computer network 200.

Administrator 305, such as the owner of the information handling system or an IT professional in an organization responsible for asset protection and security, sends commands 310 to the information handling system. Commands 310, such as "lock system," are transmitted through computer network 200, such as the Internet, and are received by the information handling system's network adapter 300. Obviously, network adapter 300 is a critical point in the communications path between administrator 305 and information handling system 100. A malevolent user, such as a thief, of information handling system 100 may attempt to thwart the reception of commands designed to protect assets stored on information handling system 100 by removing or otherwise disabling network adapter 300. When this occurs, however, the information handling system identifies that the network adapter has been removed or disabled and responds by taking various security measures as described in FIGS. 4 to 6.

Figure 4:
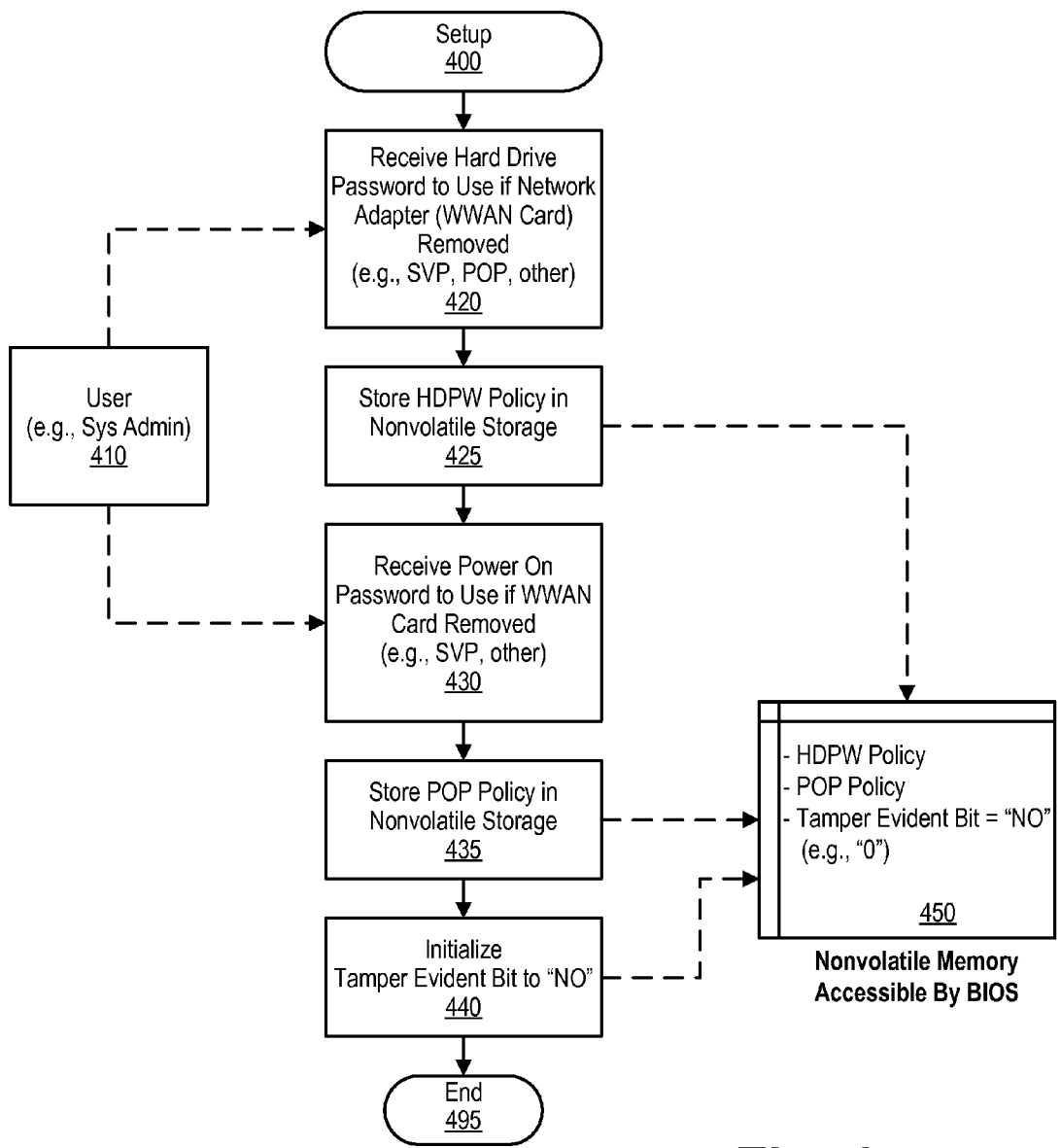
FIG. 4 is a flowchart showing steps taken to setup policies used by the information handling system when the network adapter is removed.

FIG. 4 is a flowchart showing steps taken to setup policies used by the information handling system when the network adapter is removed. Setup is performed by user 410. User 410 may only be the user that sets up the information handling system (e.g., an administrator or IT professional), with a different user being assigned the information handling system after it has been set up. This is especially the case if the organization desires that passwords that are utilized by the system when tampering is evident are unknown to the assigned user and, instead, are only known to the IT professionals with responsibilities for protecting the organization's information assets.

Processing commences at 400 whereupon, at step 420, the information handling system receives the hard drive password this is to be used if the network adapter is removed from the information handling system. For example, the policy can be established to set the hard drive password to the system's supervisory password (SVP), the power-on password (POP), or another password. In one embodiment, the password (such as the SVP) is unknown to the user of the information handling system but, instead, is known by the IT department in an organization. This embodiment prevents the user from knowingly or unknowingly divulging the password to others, such as a thief of the system. At step 425, the hard drive password policy is stored in nonvolatile memory area 450 that is accessible by an initialization process (e.g., the BIOS) that executes when the information handling system is initialized.

At step 430, the information handling system receives the new power-on password that is to be used if the network adapter is removed from the information handling system. For example, the policy can be established to set the hard drive password to the system's supervisory password (SVP) or another password. In one embodiment, the password (such as the SVP) is unknown to the user of the information handling system but, instead, is known by the IT department in an organization. This embodiment prevents the user from knowingly or unknowingly divulging the password to others, such as a thief of the system. At step 435, the power-on password policy is stored in nonvolatile memory area 450 that is accessible by an initialization process. At step 440, a tamper evident indicator, such as a tamper evident bit, is initialized to "NO" (e.g., "0") to indicate that no tampering is evident with regards to the information handling system's network adapter. This tamper evident indicator is stored in nonvolatile memory 450. When tampering is detected, this bit will be set to "YES" (e.g., "1") and initialization processing will take appropriate security measures to protect the information handling system by setting the hard drive password and the power-on passwords as described in FIGS. 5 and 6. Setup processing thereafter ends at 495.

Figure 5:
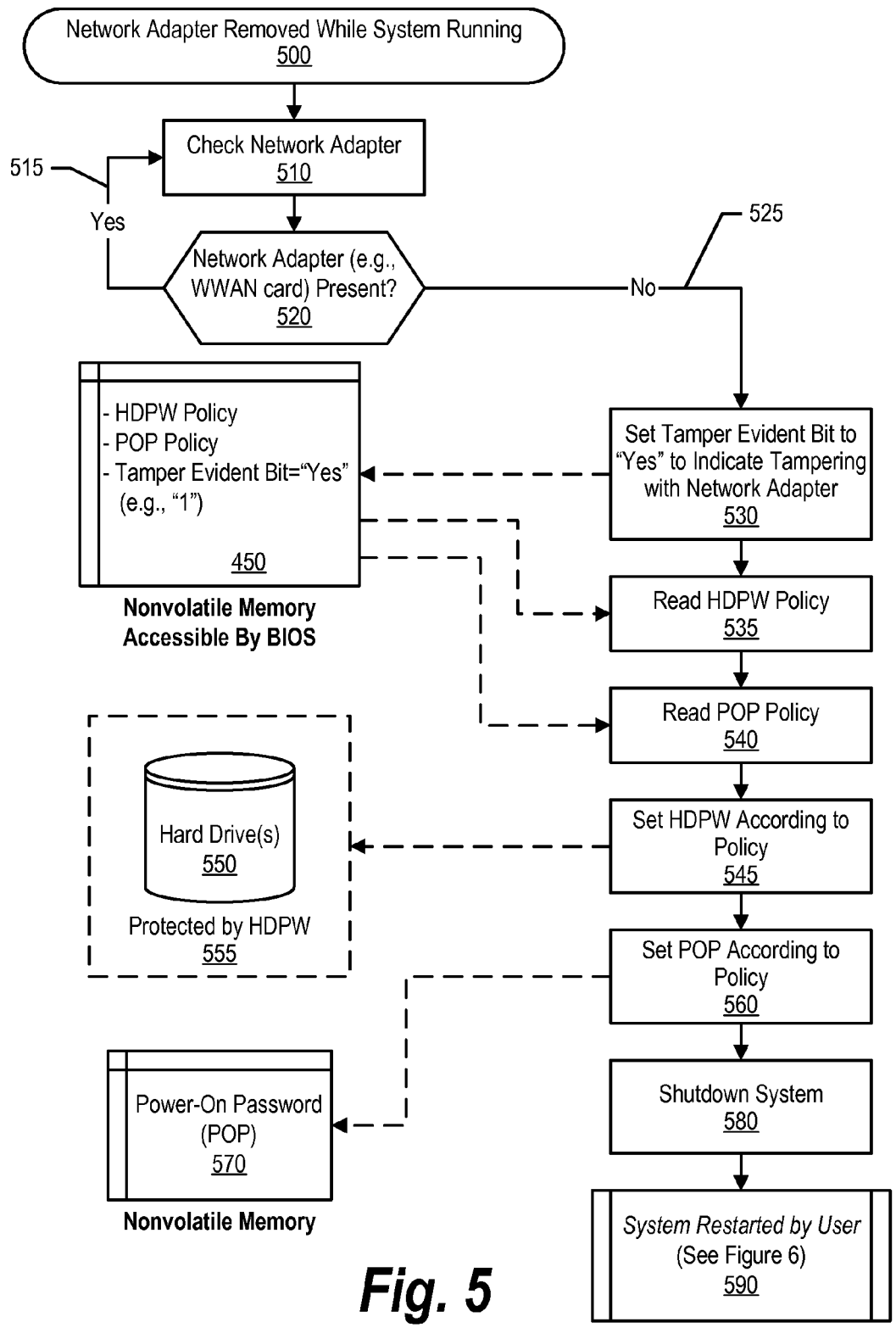
FIG. 5 is a flowchart showing steps taken when the network adapter is removed while the information handling system is operating.

FIG. 5 is a flowchart showing steps taken when the network adapter is removed while the information handling system is operating. As used herein, the term "removed" when used in relation to the information handling system's network adapter includes both physically removing the network adapter from the information handling system (e.g., removing a Wireless Wide Area Network (WWAN) card from the information handling system, etc.) as well as disabling the network adapter (e.g., turning the network adapter off so that network communications cannot be received, damaging the network adapter, or otherwise disabling the network adapter) so that the network adapter is "removed" from communicating with the information handling system.

Processing commences at 500 whereupon, at step 510, the network adapter is checked to ensure that the network adapter has not been removed (physically removed or disabled) from the information handling system. A determination is made as to whether the network adapter is electrically present in the information handling system (decision 520). If the network adapter, such as a Wireless Wide Area Network (WWAN) card, is electrically present in the information handling system, then decision 520 branches to "yes" branch 515 to continually check for the presence of the network adapter (e.g., checking for the presence of the card every few seconds).

On the other hand, upon one of the checks it is detected that the network adapter has been removed (e.g., physically removed, disabled, damaged, or otherwise unable to receive network communications) then decision 520 branches to "no" branch 525 for appropriate handling. At step 530, the tamper evident indicator (e.g., a tamper evident bit, etc.) is set in nonvolatile memory 450 to indicate that tampering has occurred with the network adapter (e.g., by setting the indicator to "YES," "TRUE," "1," or whatever value is used to indicate tampering). At step 535, the hard disk password policy is read from nonvolatile memory 450 that indicates how the hard drive password should be set if tampering is detected (e.g., the policy may be to set the hard drive password to a "supervisory" password, or some other password). At step 540, the power-on password policy is read from nonvolatile memory 450. The power-on password policy indicates how the power-on password should be set if tampering is detected (e.g., changing the normal power-on password to the supervisory password, requiring both the normal power-on password as well as the supervisory password during power-on sequencing, etc.). At step 545, the hard drive password 555 that protects files stored on one or more hard drives 550 is changed according to the hard drive password policy that was read at step 535. At step 560, power-on password 570 that is stored in nonvolatile memory is changed according to the power-on password policy read at step 540. After the hard drive password and the power-on password have been set according to appropriate policies, at step 580 the system is shutdown requiring the user (e.g., someone who has stolen the information handling system, etc.) to restart the system. At predefined process 590 the system is restarted by the user and during the startup process (described in FIG. 6), steps are taken to protect the information handling system and the information stored therein.

Figure 6:
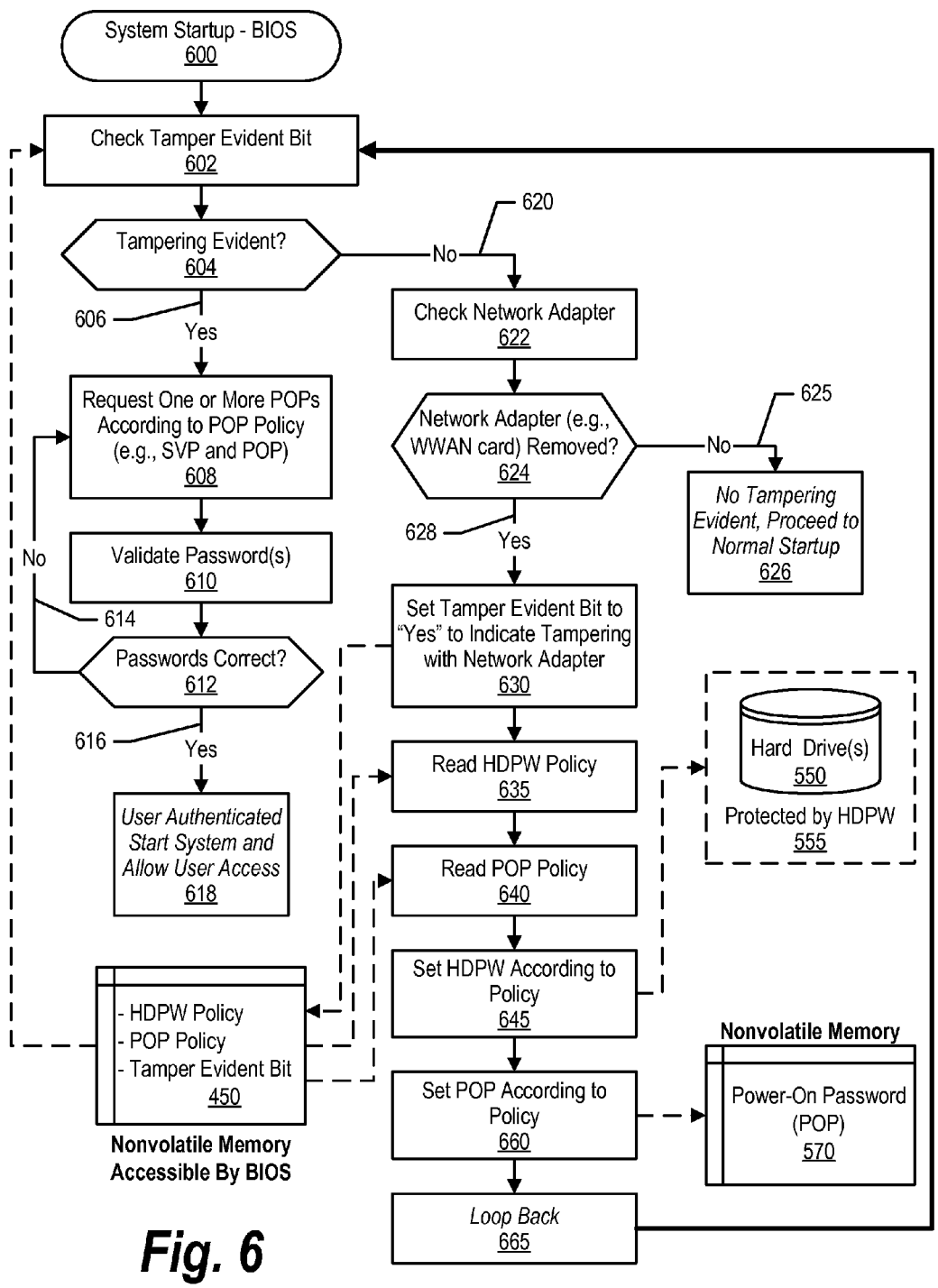
FIG. 6 is a flowchart showing steps taken by the information handling system during initialization to check for tampering and the presence of the network adapter.

FIG. 6 is a flowchart showing steps taken by the information handling system during initialization to check for tampering and the presence of the network adapter. Processing commences at 600 whereupon, at step 602, the tamper evident indicator (e.g., tamper evident bit, etc.) stored in nonvolatile memory 450 is checked to see whether tampering with the network adapter was detected during a previous use of the information handling system. A determination is made as to whether the tamper evident indicator indicates that tampering (e.g., removing, damaging, disabling, etc.) of the network adapter has taken place (decision 604). If tampering is evident based on the indicator, then decision 604 branches to "yes" branch 606 whereupon, at step 608, the startup sequence requests one or more power-on passwords from the user according to the power-on password policy (e.g., require the supervisory password (SVP), require both the SVP and the normal power-on password, etc.). At step 610, the passwords provided by the user are validated. A determination is made as to whether the password responses provided by the user are the correct passwords (decision 612). If one or more of the passwords are not correct, then decision 612 branches to "no" branch 614 and processing loops back and requests that the user re-enter the passwords. In one embodiment, a time delay is incorporated so that a thief or malevolent user cannot rapidly try guessing the passwords (e.g., using a hacking routine, etc.). In a further embodiment, the time delay is increased in each loop of branch 614 further thwarting efforts of a thief or unauthorized user. On the other hand, if the user (e.g., a system administrator with knowledge of the SVP, an authorized user, etc.) enters the correct password(s), then decision 612 branches to "yes" branch 616 and the user is allowed access to the information handling system and the files stored on the hard drives.

Returning to decision 604, if the tamper evident indicator does not indicate that tampering occurred during a previous use of the information handling system, then decision 604 branches to "no" branch 620 in order to ascertain whether the network adapter was removed (e.g., physically removed, disabled, damaged, or otherwise unable to receive network communications) while the information handling system was turned off (before the startup sequence shown in FIG. 6 commenced). At step 622, the network adapter is checked to see if the network adapter has been removed (e.g., physically removed, disabled, damaged, or otherwise unable to receive network communications) from the information handling system. A determination is made as to whether the network adapter has been removed (decision 624). If the network adapter has not been removed (e.g., is able to receive network communications and has not been disabled, damaged, etc.) then decision 624 branches to "no" branch 625 whereupon, at step 626 normal startup of the information handling system commences. Normal startup of the information handling system includes the user entering the normal power-on password (if one has been established for the system). In addition, note that during normal operation of the information handling system, the status of the network adapter is periodically checked as shown in FIG. 5 so that if the network adapter is removed after the system is started, appropriate steps are taken to protect the information handling system and the data stored therein.

On the other hand, if it is detected that the network adapter has been removed (e.g., physically removed, disabled, damaged, or otherwise unable to receive network communications) prior to the information handling system being turned on, then decision 624 branches to "yes" branch 628 for appropriate handling. At step 630, the tamper evident indicator (e.g., a tamper evident bit, etc.) is set in nonvolatile memory 450 to indicate that tampering has occurred with the network adapter (e.g., by setting the indicator to "YES," "TRUE," "1," or whatever value is used to indicate tampering). At step 635, the hard disk password policy is read from nonvolatile memory 450 that indicates how the hard drive password should be set if tampering is detected (e.g., the policy may be to set the hard drive password to a "supervisory" password, or some other password). At step 640, the power-on password policy is read from nonvolatile memory 450. The power-on password policy indicates how the power-on password should be set if tampering is detected (e.g., changing the normal power-on password to the supervisory password, requiring both the normal power-on password as well as the supervisory password during power-on sequencing, etc.). At step 645, the hard drive password 555 that protects files stored on one or more hard drives 550 is changed according to the hard drive password policy that was read at step 635. At step 660, power-on password 570 that is stored in nonvolatile memory is changed according to the power-on password policy read at step 640. At step 665, processing loops back to step 602. Now, the tamper evident indicator has been set and appropriate steps will be taken to protect the information handling system and the data stored therein (decision 604 will now branch to "yes" branch 606 and request one or more power-on passwords according to the power-on password policy).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   setting a power-on password according to a power-on password policy;
   detecting whether a network adapter has been removed from a computer system; and
   in response to detecting that the network adapter has been removed from the computer system:
      setting a tamper evident indicator in a nonvolatile memory of the computer system;
      changing the power-on password to a supervisory password; and
      setting a hard drive password according to a hard drive password policy, wherein the hard drive password protects files stored on a hard drive.

2. The method of claim 1 further comprising:
   wherein the power-on password is entered by a user of the computer system when the computer system is initialized.

3. The method of claim 2 wherein the network adapter is a wireless network adapter.

4. The method of claim 1 further comprising:
   while the computer system is operating, repeatedly checking whether the network adapter has been removed;
   if, during one of the repeated checks, it is determined that the network adapter has been removed:
      setting the tamper evident indicator in the nonvolatile memory;
      reading the hard drive password policy;
      based on the hard drive password policy, identifying a new hard drive password, wherein the setting of the hard drive password sets the hard drive password to the identified new hard drive password;
      reading the power-on password policy;
      based on the power-on password policy, identifying a new power-on password, wherein the power-on password that is used when the computer system is initialized is set to the identified new power-on password; and
      shutting down the computer system.

5. The method of claim 4 further comprising:
   after the computer system has been shut down:
   restarting the computer system by a user;
   during an initialization process performed by the computer system, requesting that the user enter the new power-on password;
   receiving a password response from the user;
   comparing the password response received from the user with the new power-on password;
   completing the initialization process and allowing the user to access files stored on the hard drive in response to the comparison revealing a match between the password response and the new power-on password; and
   denying the user access to the files stored on the hard drive in response to the comparison revealing a mismatch between the password response and the new power-on password.

6. The method of claim 1 further comprising:
   checking the tamper evident indicator in the nonvolatile memory when during an initialization process that executes when the computer system is initialized;
   in response to the tamper evident indicator indicating tampering with the network adapter during a previous use of the computer system:
      requesting one or more power-on passwords from the user according to the power-on password policy;
      receiving one or more password responses from the user;
      comparing the password responses received from the user with one or more stored power-on passwords, the power-on password included in the one or more stored power-on passwords;
      completing the initialization process and allowing the user to access files stored on the hard drive in response to the comparison revealing a match between the password responses and the stored power-on passwords; and
      denying the user access to the files stored on the hard drive in response to the comparison revealing a mismatch between one of the password responses and one of the stored power-on passwords.

7. The method of claim 6 further comprising:
   in response to the tamper evident indicator not indicating tampering with the network adapter during the previous use of the computer system:
      checking whether the network adapter is currently present in the computer system;
      in response to the checking revealing that the network adapter is not present in the computer system:
         setting the tamper evident indicator in the nonvolatile memory;
         reading the hard drive password policy;
         based on the hard drive password policy, identifying a new hard drive password, wherein the setting of the hard drive password sets the hard drive password to the identified new hard drive password;
         reading the power-on password policy;
         based on the power-on password policy, establishing one or more power-on passwords, wherein the established power-on passwords are required from the user in order to allow the user access to files stored on the hard drive, and wherein the power-on password is included in the established power-on passwords; and
         prompting the user to enter the established one or more power-on passwords.

8. An information handling system comprising:
   one or more processors;
   a memory accessible by at least one of the processors;
   a nonvolatile storage device accessible by at least one of the processors;
   a network adapter, accessible by at least one of the processors, that connects the information handling system to a computer network; and
   a set of instructions which are loaded into memory and executed by at least one of the processors in order to perform actions of:
      setting a power-on password according to a power-on password policy;

detecting whether the network adapter has been removed from the information handling system; and in response to detecting that the network adapter has been removed from the information handling system:
setting a tamper evident indicator in a nonvolatile memory of the information handling system;
changing the power-on password to a supervisory password; and
setting a hard drive password according to a hard drive password policy, wherein the hard drive password protects files stored on a hard drive.

9. The information handling system of claim 8 wherein the instructions executed by at least one of the processors perform additional actions comprising:
wherein the power-on password is entered by a user of the information handling system when the information handling system is initialized.

10. The information handling system of claim 9 wherein the network adapter is a wireless network adapter.

11. The information handling system of claim 8 wherein the instructions executed by at least one of the processors perform additional actions comprising:
while the information handling system is operating, repeatedly checking whether the network adapter has been removed;
if, during one of the repeated checks, it is determined that the network adapter has been removed:
setting the tamper evident indicator in the nonvolatile memory;
reading the hard drive password policy;
based on the hard drive password policy, identifying a new hard drive password, wherein the setting of the hard drive password sets the hard drive password to the identified new hard drive password;
reading the power-on password policy;
based on the power-on password policy, identifying a new power-on password, wherein the power-on password that is used when the information handling system is initialized is set to the identified new power-on password; and
shutting down the information handling system.

12. The information handling system of claim 11 wherein the instructions executed by at least one of the processors perform additional actions comprising:
after the information handling system has been shut down:
restarting the information handling system by a user;
during an initialization process performed by the information handling system, requesting that the user enter the new power-on password;
receiving a password response from the user;
comparing the password response received from the user with the new power-on password;
completing the initialization process and allowing the user to access files stored on the hard drive in response to the comparison revealing a match between the password response and the new power-on password; and
denying the user access to the files stored on the hard drive in response to the comparison revealing a mismatch between the password response and the new power-on password.

13. The information handling system of claim 8 wherein the instructions executed by at least one of the processors perform additional actions comprising:
checking the tamper evident indicator in the nonvolatile memory when during an initialization process that executes when the information handling system is initialized;
in response to the tamper evident indicator indicating tampering with the network adapter during a previous use of the information handling system:
requesting one or more power-on passwords from the user according to the power-on password policy;
receiving one or more password responses from the user;
comparing the password responses received from the user with one or more stored power-on passwords, the power-on password included in the one or more stored power-on passwords;
completing the initialization process and allowing the user to access files stored on the hard drive in response to the comparison revealing a match between the password responses and the stored power-on passwords; and
denying the user access to the files stored on the hard drive in response to the comparison revealing a mismatch between one of the password responses and one of the stored power-on passwords.

14. The information handling system of claim 13 wherein the instructions executed by at least one of the processors perform additional actions comprising:
in response to the tamper evident indicator not indicating tampering with the network adapter during the previous use of the information handling system:
checking whether the network adapter is currently present in the information handling system;
in response to the checking revealing that the network adapter is not present in the information handling system:
setting the tamper evident indicator in the nonvolatile memory;
reading the hard drive password policy;
based on the hard drive password policy, identifying a new hard drive password, wherein the setting of the hard drive password sets the hard drive password to the identified new hard drive password;
reading the power-on password policy;
based on the power-on password policy, establishing one or more power-on passwords, wherein the established power-on passwords are required from the user in order to allow the user access to files stored on the hard drive, and wherein the power-on password is included in the established power-on passwords; and
prompting the user to enter the established one or more power-on passwords.

15. A computer program product stored in a non-transitory computer readable storage medium, comprising functional descriptive material that, when executed by an information handling system, causes the information handling system to perform actions that include:
setting a power-on password according to a power-on password policy;
detecting whether a network adapter has been removed from the information handling system; and
in response to detecting that the network adapter has been removed from the information handling system:
setting a tamper evident indicator in a nonvolatile memory of the information handling system;
changing the power-on password to a supervisory password; and
setting a hard drive password according to a hard drive password policy, wherein the hard drive password protects files stored on a hard drive.

16. The computer program product of claim 15 wherein the network adapter is a wireless network adapter.

17. The computer program product of claim 15 further comprising functional descriptive material that causes the information handling system to perform additional actions that include:
    while the information handling system is operating, repeatedly checking whether the network adapter has been removed;
    if, during one of the repeated checks, it is determined that the network adapter has been removed:
        setting the tamper evident indicator in the nonvolatile memory;
        reading the hard drive password policy;
        based on the hard drive password policy, identifying a new hard drive password, wherein the setting of the hard drive password sets the hard drive password to the identified new hard drive password;
        reading the power-on password policy;
        based on the power-on password policy, identifying a new power-on password, wherein the power-on password that is used when the information handling system is initialized is set to the identified new power-on password; and
        shutting down the information handling system.

18. The computer program product of claim 17 further comprising functional descriptive material that causes the information handling system to perform additional actions that include:
    after the information handling system has been shut down:
    restarting the information handling system by a user;
    during an initialization process performed by the information handling system, requesting that the user enter the new power-on password;
    receiving a password response from the user;
    comparing the password response received from the user with the new power-on password;
    completing the initialization process and allowing the user to access files stored on the hard drive in response to the comparison revealing a match between the password response and the new power-on password; and
    denying the user access to the files stored on the hard drive in response to the comparison revealing a mismatch between the password response and the new power-on password.

19. The computer program product of claim 15 further comprising functional descriptive material that causes the information handling system to perform additional actions that include:
    checking the tamper evident indicator in the nonvolatile memory when during an initialization process that executes when the information handling system is initialized;
    in response to the tamper evident indicator indicating tampering with the network adapter during a previous use of the information handling system:
        requesting one or more power-on passwords from the user according to the power-on password policy;
        receiving one or more password responses from the user;
        comparing the password responses received from the user with one or more stored power-on passwords, the power-on password included in the one or more stored power-on passwords;
        completing the initialization process and allowing the user to access files stored on the hard drive in response to the comparison revealing a match between the password responses and the stored power-on passwords; and
        denying the user access to the files stored on the hard drive in response to the comparison revealing a mismatch between one of the password responses and one of the stored power-on passwords.

20. The computer program product of claim 19 further comprising functional descriptive material that causes the information handling system to perform additional actions that include:
    in response to the tamper evident indicator not indicating tampering with the network adapter during the previous use of the information handling system:
        checking whether the network adapter is currently present in the information handling system;
        in response to the checking revealing that the network adapter is not present in the information handling system:
            setting the tamper evident indicator in the nonvolatile memory;
            reading the hard drive password policy;
            based on the hard drive password policy, identifying a new hard drive password, wherein the setting of the hard drive password sets the hard drive password to the identified new hard drive password;
            reading the power-on password policy;
            based on the power-on password policy, establishing one or more power-on passwords, wherein the established power-on passwords are required from the user in order to allow the user access to files stored on the hard drive, and wherein the power-on password is included in the established power-on passwords; and
            prompting the user to enter the established one or more power-on passwords.

\* \* \* \* \*